United States Patent
Eoff et al.

(10) Patent No.: US 7,331,390 B2
(45) Date of Patent: Feb. 19, 2008

(54) COMPOSITIONS AND METHODS FOR PLUGGING AND SEALING A SUBTERRANEAN FORMATION

(75) Inventors: Larry S. Eoff, Duncan, OK (US); B. Raghava Reddy, Duncan, OK (US); Eldon D. Dalrymple, Duncan, OK (US); Julio Vasquez, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 268 days.

(21) Appl. No.: 11/133,505

(22) Filed: May 20, 2005

(65) Prior Publication Data

US 2006/0260812 A1 Nov. 23, 2006

(51) Int. Cl.
*E21B 43/22* (2006.01)
*E21B 43/27* (2006.01)

(52) U.S. Cl. .................. 166/279; 166/282; 166/300

(58) Field of Classification Search .............. None
See application file for complete search history.

(56) References Cited

U.S. PATENT DOCUMENTS

| | | | |
|---|---|---|---|
| 5,836,392 A | 11/1998 | Urlwin-Smith | 166/295 |
| 6,176,315 B1 | 1/2001 | Reddy et al. | 166/295 |
| 6,192,986 B1 | 2/2001 | Urlwin-Smith | 166/295 |
| 7,091,160 B2 * | 8/2006 | Dao et al. | 507/224 |
| 2006/0234871 A1 * | 10/2006 | Dalrymple et at. | 507/211 |

\* cited by examiner

*Primary Examiner*—Zakiya W. Bates
(74) *Attorney, Agent, or Firm*—Robert A. Kent; Crutsinger & Booth

(57) ABSTRACT

The invention provides for a composition for treating a subterranean formation, the composition comprising: a) a crosslinkable water-soluble polymer comprising at least one acylated amine unit; and b) a crosslinkable water-soluble polymer comprising a functional group selected from the group consisting of carboxylic acid and carboxylic acid derivative. The invention also provides for a method of treating a subterranean formation penetrated by a wellbore, the method comprising the steps of forming the treatment fluid and introducing the treatment fluid through the wellbore and into contact with the formation.

13 Claims, 2 Drawing Sheets

COMPOSITIONS AND METHODS FOR PLUGGING AND SEALING A SUBTERRANEAN FORMATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to compositions and to methods for treating a subterranean formation. More specifically, the invention relates to compositions and methods useful for sealing or blocking the fluid flow through a zone of a subterranean formation. The fluids and methods are particularly useful in hydrocarbon wells and production methods.

BACKGROUND OF THE INVENTION

There has been a continuing need for improving the oil/water ratio during hydrocarbon production. One way to improve hydrocarbon production is by using chemical gel systems to resist the flow of injected or natural aqueous drive fluid through high permeability channels and fractures, sometimes referred to in the art as "conformance control." The general approach has been to inject a mixture of reagents, initially low in viscosity, into a zone of the formation that has high permeability. After a sufficient time to allow the mixture to be pumped into the subterranean formation or when exposed to the elevated temperature of the formation, the mixture of reagents then forms a gel to block the flow of water. Several mixtures of reagents have been used in this way.

U.S. Pat. No. 5,836,392 entitled "Oil And Gas Field Chemicals" and issued on Nov. 17, 1998, having named inventor Phillip Lance Urlwin-Smith, discloses a method for conformance control of a reservoir comprising injecting into a zone of the reservoir an aqueous solution of a copolymer comprising at least one ethylenically unsaturated polar monomer and at least one copolymerizable ethylenically unsaturated ester formed from a hydroxy compound of the formula ROH wherein R is a selected alkyl group, alkenyl group, cycloalkyl group, aryl group or such groups substituted with from 1 to 3 hydroxyl, ether or thio ether groups or a heterocyclic or selected heterocyclic alkylene group and at least one heteroatom selected from oxygen, nitrogen and sulfur and a selected alkenoic or aralkenoic carboxylic acid or sulfonic or phosphoric acid together with a crosslinking agent comprising a multivalent metal ion capable of crosslinking an acrylic acid polymer to form a viscous gel. The injected fluid is flowed through at least a portion of a high permeability region within said zone wherein it is heated to an elevated temperature whereupon crosslinking of the polymers occurs to form a substantially non-flowable gel within said high permeability region. The crosslinking of the injected fluid to form the non-flowable gel within the formation reduces the permeability of said region in said zone. See Abstract. U.S. Pat. No. 5,836,392 is incorporated herein by reference in its entirety.

U.S. Pat. No. 6,192,986 entitled "Blocking Composition For Use In Subterranean Formation," issued Feb. 27, 2001, and having named inventors Phillip. Lance Urlwin-Smith, discloses a polymer composition for pumping downhole to gel in a subterranean formation comprising a water-soluble copolymer of (i) at least one non-acidic ethylenically unsaturated polar monomer and (ii) at least one copolymerisable ethylenically unsaturated ester; and an organic gelling agent therefore. Another water-based gel system for conformance control is based on a polyethyleneimine (PEI) crosslinker and a copolymer of acrylamide and t-butyl acrylate. See Abstract. U.S. Pat. No. 6,192,986 is incorporated herein by reference in its entirety.

While the use of aqueous polymer fluids to reduce undesired water production has achieved varying degrees of success, these fluids are undesirable in that they either have short gel times or low gel stabilities at high temperatures, high toxicity, and/or bio-accumulate in the environment. Short gel times for aqueous polymer fluids do not allow for adequate placement time in the zone of interest because they prematurely gel due to the elevated temperatures in the well bore and in the formation. Hence, these aqueous polymer fluids require pre-cooling the formation by injecting copious amounts of aqueous fluids prior to injecting gelling composition.

SUMMARY OF THE INVENTION

The invention provides for a composition for treating a subterranean formation, the composition comprising: a) a crosslinkable water-soluble polymer comprising at least one acylated amine unit; and b) a crosslinkable water-soluble polymer comprising a functional group selected from the group consisting of carboxylic acid and carboxylic acid derivative. The invention also provides for a method of treating a subterranean formation penetrated by a wellbore, the method comprising the steps of forming the treatment fluid and introducing the treatment fluid through the wellbore and into contact with the formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWINGS

The accompanying figures are incorporated into and form a part of the specification to illustrate examples of the present inventions. These drawings together with the description serve to explain the principles of the inventions. The figures are only for illustrating examples of the inventions and are not to be construed as limiting the inventions to the described examples. The various advantages of the present inventions will be apparent from a consideration of the drawing in which.

DETAILED DESCRIPTION OF THE PREFERRED EMBODIMENTS

Figure 1:
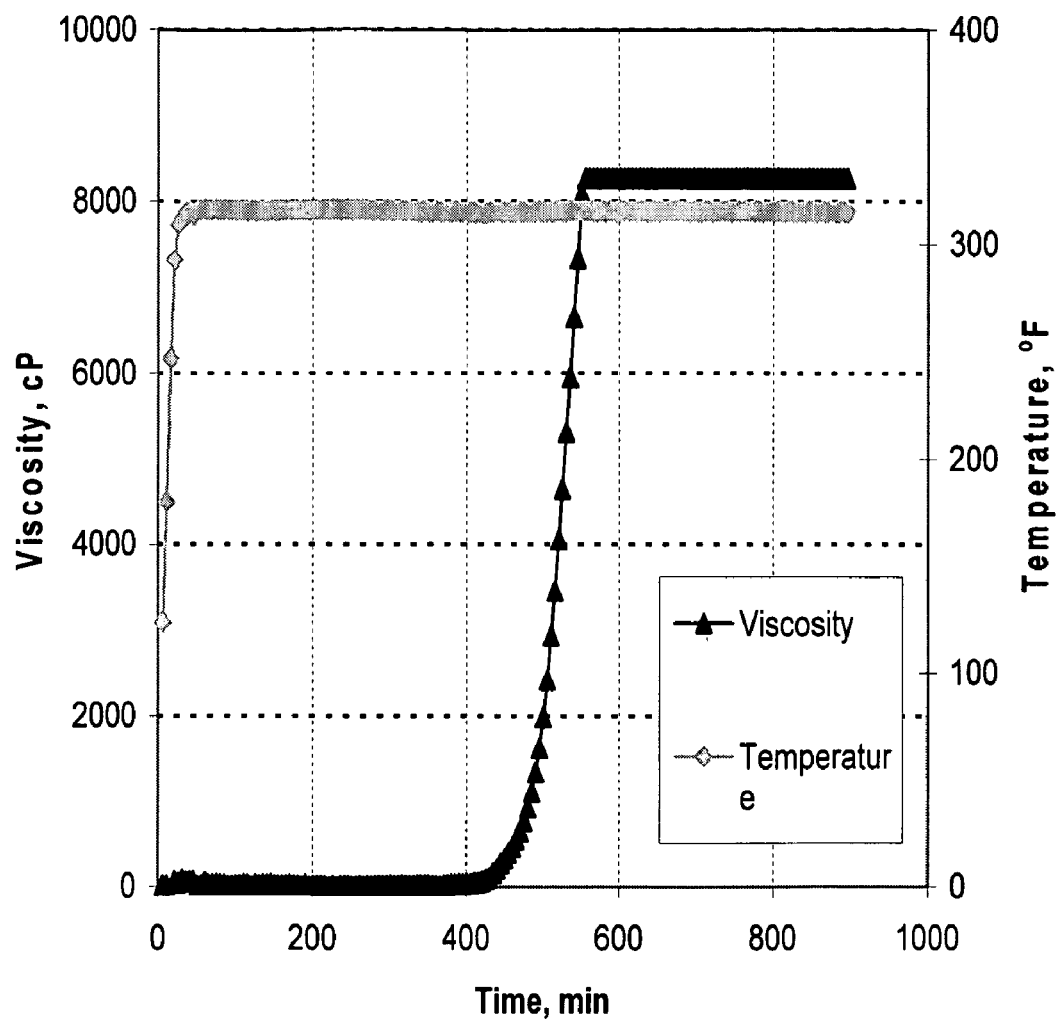
FIG. 1 is a graphical plot of viscosity in centepoise (cp) versus time (minute) as a function of temperature (° F.) for a composition of the invention.

The invention provides a method for controlling the gel rate of crosslinked polymer systems in which pre-mixtures of polymers can be made and injected into a subterranean formation without risk of premature gelation. It has been discovered that a water-soluble polymer comprising acylated amine units can be used as a crosslinker to raise the gelation temperature limit to at least 375° F. Also included in the treatment fluid is a crosslinkable water-soluble polymer that comprises a functional group selected from the group consisting of carboxylic acid and carboxylic acid derivative.

The water for use in the composition can be of any convenient source, including fresh water, seawater, natural brine, formulated brine, 2% KCl solution, and any mixture of any of the foregoing in any proportion thereof. Formulated brine is manufactured by dissolving one or more soluble salts in water, natural brine, or seawater. Representative soluble salts are the chloride, bromide, acetate and formate salts of potassium, sodium, calcium, magnesium and zinc.

The composition of the invention includes a crosslinkable water-soluble polymer comprising at least one acylated amine unit. The amine is acylated preferably prior to injection into the subterranean formation. In this way, the composition of the invention advantageously has a low tendency to crosslink and gel in the wellbore (i.e. reduced gel buildup) and has rapid crosslinking at the high temperatures of the formation. Preferred acylated amine groups include acetyl and formyl amine groups. One way that the acylated amine is formed is by reacting a polyamine with a carboxylic acid anhydride or ester. Preferred carboxylic anhydrides for acylation are acetic anhydride and formic anhydride. Preferred carboxylic esters for acylation include alkyl acetate, for example ethyl acetate, butyl acetate, ethyl formate and butyl formate. The acylated amine can also be formed by acylating poly(vinyl amine/vinyl alcohol). Alternately, the acylated amine can be formed by acylating polyalkylene polyamine, for example, polyethyleneimine (PEI). Also, the acylated amine can be formed by polymerizing a monomer containing acylated amine, for example vinylformamide to form a water-soluble polymer polyvinylformamide. The vinylformamide can be copolymerized with other monomers, for example 2-acrylamido-2-methylpropanesulfonic acid (AMPS), and/or N,N-dimethylacrylamide (NNDMA). Polyvinylformamide for use in the invention provides a more environmentally acceptable crosslinker as compared to the conventionally-used crosslinker, PEI. As those skilled in the art understand, other acylated amines that are not mentioned herein are also useful for the invention.

Preferably, the degree of acylation of the amine groups in the water-soluble polymer can range from 5% to 100% of the amine groups. In the case of acylating polyamine, the degree of acylation can be varied by controlling the amount of acylating compound, for example carboxylic anhydride in relation to the molar amounts of the amines present in the polymer. Alternately, the degree of acylation in an acylated polymer can be varied by controlled hydrolysis of the acyl groups in the presence of an acid or a base.

The concentration of the acylated amine in the treatment fluid is selected to give a desired gel time. For example, the concentration can be in the range of 0.2% to 10% by weight of the total fluid. The ratio of the acylated amine to the crosslinkable water-soluble polymer comprising a functional group consisting of carboxylic acid and carboxylic acid derivative is from about 1:0.5 to about 1:20, preferably in the ratio of 1:3 to 1:10.

The composition for treating a subterranean formation also comprises a crosslinkable water-soluble polymer comprising a functional group selected from the group consisting of carboxylic acid and carboxylic acid derivative. The carboxylic acid derivative, for example, can consist of an ester, an amide, an anhydride, an imide, and a nitrile group. Such polymers can be homopolymers, copolymers, and/or terpolymers made from a variety of monomers. Examples of suitable polymers include the polymerization reaction product of acrylamide and t-butyl acrylate, a terpolymer of 2-acrylamido-2-methylpropanesulfonic acid copolymer (AMPS), acrylamide (AA), and N,N-dimethylacrylamide (N7NDMA). Such polymers can be obtained by processes described in U.S. Pat. No. 6,192,986 that was filed on Feb. 18, 1999; U.S. Pat. No. 5,836,392 that was filed on Aug. 5, 1997; and U.S. Pat No. 6,176,315 that was filed on Dec. 4, 1998, all assigned to the assignee of the present invention, and all herein incorporated by reference in their entirety. Examples of such polymers include polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymer; a vinyl pyrrolidone/2-acrylamido-2-methylpropane sulfonic acid/acrylamide terpolymer; 2-acrylamido-2-methylpropane sulfonic acid/N-N-dimethylacrylamide/acrylamide terpolymer; and any mixture of any of the foregoing in any proportion thereof. Other compounds that can be used to crosslink with the water-soluble polymer comprising acylated amine units are disclosed in U.S. Pat. No. 6,176,315, filed on Dec. 4, 1998 by the assignee of the present invention, which is incorporated by reference in its entirety. Another example of an acrylamide based copolymer is described in U.S. Pat. No. 5,836,392.

The invention also provides a method of treating a subterranean formation penetrated by a wellbore, the method comprising the step of forming a treatment fluid and introducing the treatment fluid through the wellbore and into contact with the formation.

The crosslinkable water-soluble polymer comprising a carboxylic acid functional group or a derivative is capable of crosslinking at 20° C. to at least 204° C. (68° F. to 400° F.). In the method of the invention, it is generally unnecessary to have any pre-cool step, especially in wells with downhole temperatures of even up to about 204° C. (400° F.). As the solution is pumped downhole and permeates into the zone, the solution heats up and eventually reaches the formation temperature, after which gelling occurs. The compositions and methods of the invention can be applied to both high and low zone permeabilities.

The composition of the invention is usually soluble in water to an extent of at least 1 gram/liter (g/l) e.g. 1 g/l to 200 g/l in distilled water at 15° C. (59° F.), especially in aqueous sodium chloride solution containing 32 g/l NaCl at 25° C. (77° F.).

The composition preferably has an average molecular weight of at least 50,000 e.g. 50,000 to 20 million, such as 100,000 to 10 million, especially 100,000 to 500,000, and especially 1 to 10 million. The molecular weight can be determined by conventional methods, e.g. gel permeation chromatography or intrinsic viscosity. The low molecular weight composition may, for example, have a viscosity in an aqueous 3.6% by weight solution at 19° C. (67° F.) of 10 to 500 centipoises (cps) (measured at 60 revolutions per minute (rpm) with a Haake viscometer). Preferably the composition is shear thinnable, e.g. with the viscosity reducing by at least 10% on increasing the shear rate by 10%.

As mentioned previously, the composition of the invention contains water in which the polymers can be dissolved. The composition is usually made up just before use by mixing the polymers in an aqueous medium, e.g. sea water, and then injecting the composition into the formation. The composition is preferably kept at below 50° C. (122° F.), e.g. below 30° C. (86° F.), before use. The concentration of polymers in the aqueous composition is preferably from 500 to 100,000 parts per million (ppm), in particular 500 to 10,000 ppm for polymers of molecular weight of at least 1 million, and from 10,000 to 100,000 ppm for polymers of molecular weight 50,000 to 1 million.

The composition of the invention may be injected into a formation via a producing well or via a secondary injection well (for use with a water flood or squeeze technique), for example. The composition of the invention may also contain other ingredients, such as gelling agents, antioxidants, biocides, and/or oxygen scavengers. The injection can, if desired, be preceded by a pre-cooling treatment, e.g. with a cooler aqueous fluid water to stop premature crosslinking. The aqueous compositions can simply be injected into the formation, but preferably they are forced into it by pumping. The formation can be of acidic rock, e.g. sandstone or neutral to basic rock, e.g. limestone with associated formation water of e.g. pH 3 to 6.5, such as 4 to 6, or pH 6.5 to 8, respectively. The compositions of the invention are especially suitable for use with acidic and carbonate rocks, especially at about 60° C. to 150° C. (140° F. to 302° F.).

The composition of the invention advantageously has a low tendency to crosslink and gel in the wellbore (i.e. reduced gel build-up) and has rapid crosslinking at the high temperatures of the formation. The composition of the invention, therefore, is less susceptible to process handling problems, such as high injection pressures without the environmental and other problems associated with the use of metal crosslinking agents. As those skilled in the art understand, the well can be shut in for 1-70 hours, for example, to allow gelling to occur, and then production can be restarted.

To further illustrate the present invention, and not by way of limitation, the following examples are provided.

Acetylation of Polyethyleneimine

EXAMPLE 1

To acylate polyethyleneimine (PEI), 210 mL of polyethyleneimine (33% aqueous solution) was placed in a reaction flask equipped with a condenser, thermocouple, a magnetic stirring bar, and an addition funnel. 140 mL of acetic anhydride was placed in an addition funnel and was added slowly, while stirring, to the PEI solution until the temperature reached 150° F. Acetic anhydride was added at a rate to maintain the temperature constant. Once the addition of acetic anhydride was complete, the solution was stirred for three hours at 150° F. and then cooled to room temperature. The pH of the solution was adjusted to 7.0 using 71 mL of a concentrated solution of sodium hydroxide (50% NaOH). Finally, 52 mL of water were added to the reaction to adjust the activity of the solution to 40%. The product of this procedure is referred to as PEI/AA in FIG. 2.

Crosslinking Experiments

A copolymer of acrylamide and t-butyl acrylate (PAtBA, 20% active) was used as the crosslinkable water-soluble base polymer to be crosslinked with the acetylated PEI (PEI/AA) obtained from the above procedure. The following formulation was prepared to obtain 100 mL of solution by mixing 35 mL of PAtBA (7% active), 5 mL of acetylated PEI (2% active), 2 grams of KCl (2% solution), and 58 mL of water. Note that the values in parenthesis represent the component concentration in the final solution.

Gelation time of the system was monitored with a High-Pressure PVS Rheometer (Brookfield Engineering Laboratories Inc., Middleboro, Mass.) which is a dynamic coaxial cylinder, controlled shear rate rheometer that allows viscosity measurements under pressure at elevated temperatures. Approximately 30 mL of solution was placed in the sample cup. The bob/spindle sample cup code used was PVS-B5-D (BOB 1). The outer cylinder was driven by a stepper motor at a speed of 20 revolutions per minute. This method defines gelation time as the time required for a polymer system to begin building viscosity. If the increase in viscosity while crosslinking is nearly linear, the inflection point of the curve corresponds quite closely to the time when the viscosity begins to build and can be defined as 'gel time'.

Turning initially to FIG. 1, illustrated is a graphical plot of viscosity in centipoises (cp) versus time (minute) as a function of temperature (° F.) for a particular composition. Specifically, the composition contained 7% active PAtBA, 2% active PEI/AA, in 2% KCl. The pH of the composition was measured at 5.97. As illustrated, gelation time was approximately 8.1 hours at 325° F. (163° C.).

Figure 2:
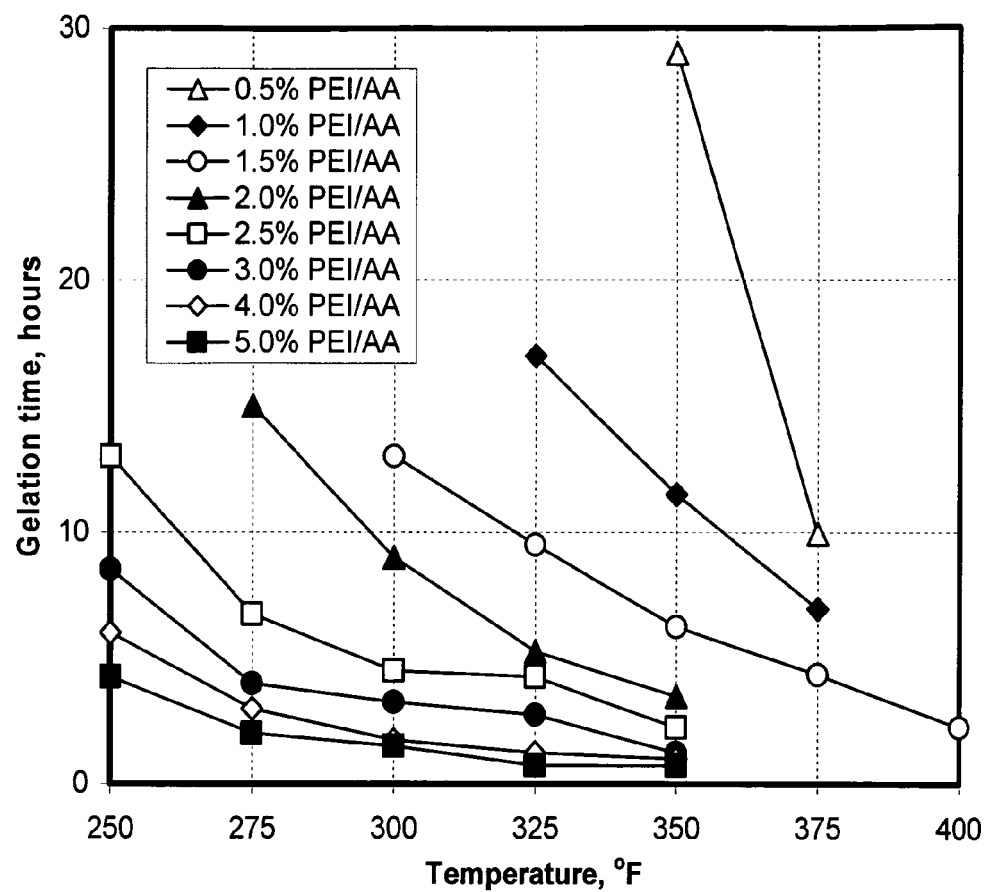
FIG. 2 is a graphical plot of gelation time (hours) versus temperature (° F.) for various weight ratio of base polymer to crosslinker.

In further experiments, the amount of PEI/AA was varied while keeping the amounts of other materials and total volume of the solution constant such that the amount of PEI/AA ranged from 0.5% to 5% by weight of total composition and the gel time measurements were performed according to the procedure above at different temperatures. The results are shown in FIG. 2. FIG. 2 is a graphical plot of gelation time (hours) versus temperature (° F.) for various weight ratio of base polymer to crosslinker. As illustrated in FIG. 2, commercially useful gel times can be obtained at temperatures as high as 400° F. by selecting an appropriate weight ratio of base polymer to crosslinker. Without acetylation, gel times typically less than 1 hour were achieved.

EXAMPLE 2

Polyvinylformamide (available from BASF Corporation as Lupamin 1500) was used as the water-soluble polymer comprising acylated amine units in combination with the base polymer, PAtBA or AMPS/AA/NNDMA in amounts 2% and 7% respectively in a solution containing sufficient potassium chloride to provide a 10% KCl solution. In the case of AMPS/AA/NNDMA, the molar ratio of monomers was 50:20:30. The gel time measurements at the temperatures shown in Table 1 were performed as described in EXAMPLE 1.

As shown in Table 1, the reaction product of formylated polyvinylamine, which is polyvinylformamide, is used as the water-soluble polymer comprising acylated amine. Polyvinylformamide is effective at crosslinking the base polymer, which is made up of either a reaction product of acrylamide and t-butyl acrylate (PAtBA), or the base polymer is made up of the terpolymer of AMPS/AA/NNDMA. The polyvinylformamide crosslinker and base polymer were added to the mix water and stirred until homogeneous. The mixture was then placed in a closed glass vial, which was placed in an oven at the designated temperature. The vials were removed periodically and observed for the gel formation. All tests were done with the same polyvinylformamide crosslinker, the only thing that was varied was the temperature. Without being limited by theory, it is believed that by increasing the amine level in the crosslinker, the gel time decreases. Also, the amine level can be tailored to suit a broad temperature range.

TABLE 1

Gel Times Using Polyvinylformamide as a Crosslinker

| Crosslinker: Crosslinkable water-soluble polymer comprising acylated amine unit | Base polymer: Crosslinkable water-soluble polymer comprising a functional group selected from the group consisting of a carboxylic acid or derivative. | Temp. (° F.) | Gel Time (hours) |
|---|---|---|---|
| Polyvinylformamide | PAtBA | 300 | 7 |
| Polyvinylformamide | PAtBA | 325 | 3 |
| Polyvinylformamide | AMPS/AA/NNDMA[1] | 350 | 9[2] |
| Polyvinylformamide | AMPS/AA/NNDMA | 375 | 4[2] |

[1]Molar ratio of AMPS/AA/NNDMA: 50/20/30
[2]Composition of the mixture: 7% AMPS/AA/NNDMA; 2% PVF in 10% KCl solution.

A number of variables can be used to control gel time, or impact the gelling of the acylated amine with polymers capable of crosslinking with acylated amine. Such variables include type of polymer, crosslinker concentration, pH of the gel system, mix water, and temperature of the mix water.

In comparing the ability of polymers to crosslink, or react with the amine group, the order of ease of crosslinking reactivity suggests steric resistance to the approach of the amine group at the carbonyl group in polymers such as the terpolymer AMPS/AA/NNDMA, which may be due to the adjacent bulky groups on these polymers. Generally, by increasing the fraction of bulky or less reactive units in the water-soluble polymer that is crosslinked with the acylated amine, the temperature at which gelation occurs can be increased, the pumping time at a given temperature can be increased and/or the stability of the gel formed can be increased or decreased.

Yet another variable that can be used to control gel time is the gel system pH. The crosslinking reaction proceeds more slowly with decreasing gel system pH. This observation is in accordance with expectations for amine-type crosslinkers. Without being limited by theory, it is believed that the lone pair of electrons on the amine nitrogen groups is expected to be protonated in acidic media, making them unavailable to initiate a nucleophilic attack on the water-soluble polymer that is crosslinked with the acylated amine. Therefore, gel time can be controlled by varying the gel system pH.

Still another variable that can be used to control gel time is the mix water, which is believed to effect the crosslinking reaction. The crosslinking reaction can proceed significantly faster in fresh water as compared to seawater.

Therefore, gel time can be controlled by variables such as solution pH (lowering of pH increases gel times due to protonation of amine group of the acylated amine crosslinker), and base polymer/crosslinker ratio and the corresponding solution concentrations.

After careful consideration of the specific and exemplary embodiments of the invention described, a person of ordinary skill in the art will appreciate that certain modifications, substitutions and other changes can be made without substantially deviating from the principles of the invention. The detailed description is illustrative, the spirit and scope of the invention being limited only by the appended claims.

The invention claimed is:

1. A method of treating a subterranean formation penetrated by a wellbore, the method comprising the steps of:
   (a) forming a treatment fluid comprising:
       (i) a crosslinkable water-soluble polymer comprising at least one acylated amine unit; and
       (ii) a crosslinkable water-soluble polymer comprising a functional group selected from the group consisting of carboxylic acid and carboxylic acid derivative; and
   (b) introducing the treatment fluid through the wellbore and into contact with the formation.

2. The method according to claim 1, wherein the crosslinkable water-soluble polymer comprising at least one acylated amine unit comprises acylated polyvinylamine.

3. The method according to claim 1, wherein the crosslinkable water-soluble polymer comprising at least one acylated amine unit comprises an acylated polyethyleneimine.

4. The method according to claim 1, wherein the crosslinkable water soluble polymer comprising at least one acylated amine unit comprises polyvinylformamide.

5. The method according to claim 1, wherein the crosslinkable water-soluble polymer comprising at least one acylated amine unit comprises acylated poly(vinyl amine/vinyl alcohol).

6. The method according to claim 1, wherein 5% to 100% of the amine units of the crosslinkable water-soluble polymer are acylated.

7. The method according to claim 1, wherein the carboxylic acid derivative is selected from the group consisting of an ester, an amide, an anhydride, an imide, and a nitrile group.

8. The method according to any one of claims 1-6, wherein the crosslinkable water-soluble polymer comprising a functional group selected from the group consisting of carboxylic acid and carboxylic acid derivative is selected from the group consisting of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymer; a vinyl pyrrolidone/2-acrylamido-2-methylpropane sulfonic acid/acrylamide terpolymer; 2-acrylamido-2-methylpropane sulfonic acid/N-N-dimethylacrylamide/acrylamide terpolymer; and any mixture of any of the foregoing in any proportion thereof.

9. The method according to claim 1, wherein the ratio of the crosslinkable water soluble polymer in a) to the crosslinkable water-soluble polymer in b) is from about 1:0.5 to about 1:20.

10. The method according to claim 1, wherein the ratio of the crosslinkable water soluble polymer in a) to the crosslinkable water-soluble polymer in b) is from about 1:3 to about 1:10.

11. The method according to claim 1, wherein the crosslinkable water-soluble polymer comprising at least one acylated amine unit comprises an acylated polyamine.

12. The method according to claim 11, further comprising the step of:
    shutting in the well to allow gelling to occur.

13. The method according to claim 11, wherein the crosslinkable water-soluble polymer comprising a functional group selected from the group consisting of carboxylic acid and carboxylic acid derivative is selected from the group consisting of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymer; a vinyl pyrrolidone/2-acrylamido-2-methylpropane sulfonic acid/acrylamide terpolymer; 2-acrylamido-2-methylpropane sulfonic acid/N-N-dimethylacrylamide/acrylamide terpolymer; and any mixture of any of the foregoing in any proportion thereof.

* * * * *